US009883664B2

(12) United States Patent
Bos (10) Patent No.: US 9,883,664 B2
(45) Date of Patent: Feb. 6, 2018

(54) BALLOON FISHING SYSTEM AND METHOD (76) Inventor: Jon A. Bos, Wilmington, NC (US)

( * ) Notice: Subject to any disclaimer, the term of this patent is extended or adjusted under 35 U.S.C. 154(b) by 356 days.

(21) Appl. No.: 14/127,468

(22) PCT Filed: Jun. 17, 2012

(86) PCT No.: PCT/US2012/042847
§ 371 (c)(1),
(2), (4) Date: Mar. 30, 2014

(87) PCT Pub. No.: WO2012/177525
PCT Pub. Date: Dec. 27, 2012

(65) Prior Publication Data
US 2014/0223800 A1    Aug. 14, 2014

Related U.S. Application Data

(60) Provisional application No. 61/498,581, filed on Jun. 19, 2011.

(51) Int. Cl.
*A01K 93/00* (2006.01)
*A01K 91/03* (2006.01)
*A01K 97/00* (2006.01)
*A01K 91/02* (2006.01)

(52) U.S. Cl.
CPC .............. *A01K 93/00* (2013.01); *A01K 91/02* (2013.01); *A01K 91/03* (2013.01); *A01K 97/00* (2013.01); *Y10T 29/49* (2015.01); *Y10T 29/4998* (2015.01)

(58) Field of Classification Search
CPC ........ A01K 99/00; A01K 97/00; A01K 91/06; A01K 91/02; A01K 91/03; A01K 93/00
USPC .......... 43/4, 43.1, 44.87, 44.88, 44.9, 44.91, 43/44.92, 44.95, 19; 24/128, 115 R, 24/129 R, 130, 305, 326, 343, 346, 369; 446/220, 222
See application file for complete search history.

(56) References Cited

U.S. PATENT DOCUMENTS

| 1,080,013 | A | * | 12/1913 | Landin | .................... F16G 11/00 |
|---|---|---|---|---|---|
| | | | | | 174/157 |
| 1,122,359 | A | * | 12/1914 | Bissett | ................... A01K 93/00 |
| | | | | | 24/115 G |
| 1,296,370 | A | * | 3/1919 | Darling | .................. A01K 91/06 |
| | | | | | 43/43.12 |
| 1,468,720 | A | * | 9/1923 | Low | ....................... A01K 93/00 |
| | | | | | 24/136 R |

(Continued)

FOREIGN PATENT DOCUMENTS

| DE | 3825818 A1 * | 2/1990 | ............. A01K 91/02 |
|---|---|---|---|
| FR | 2767640 A1 * | 3/1999 | ............. A01K 91/02 |

(Continued)

OTHER PUBLICATIONS

Translation of KR 10-2005-0107394 A.*

(Continued)

*Primary Examiner* — Darren W Ark (57) ABSTRACT

A fishing rig may include a first fastener mechanism configured to attach to a fishing line. A second fastener mechanism may be configured to attach to at least one a balloon and a bobber. A button may cooperate with the first or second fastener mechanism to release and lock the fishing line or balloon.

12 Claims, 7 Drawing Sheets

(56) References Cited

U.S. PATENT DOCUMENTS

| | | | | |
|---|---|---|---|---|
| 1,680,318 A * | 8/1928 | Callahan | A63H 27/10 | 446/222 |
| 2,246,229 A * | 6/1941 | Wohlmuth | A22C 15/008 | 24/130 |
| 2,376,958 A * | 5/1945 | Chapman | A01K 93/00 | 43/44.88 |
| 2,396,906 A * | 3/1946 | Windson | A63H 27/10 | 24/30.5 S |
| 2,496,334 A * | 2/1950 | Chapman | A01K 93/00 | 43/44.88 |
| 2,501,471 A * | 3/1950 | Larson | A01K 93/00 | 43/44.87 |
| 2,547,469 A * | 4/1951 | Husson | A01K 91/047 | 24/129 R |
| 2,560,129 A * | 7/1951 | Rhotehamel | A01K 93/00 | 43/44.95 |
| 2,562,054 A * | 7/1951 | Mathieu | A01K 95/00 | 43/43.12 |
| 2,646,019 A * | 7/1953 | Chetlan | B64B 1/40 | 446/220 |
| 2,677,208 A * | 5/1954 | Fishmaster | A01K 93/00 | 43/43.11 |
| 2,719,381 A * | 10/1955 | Matras | A01K 93/00 | 43/44.95 |
| 2,720,720 A * | 10/1955 | Landrum | A01K 93/00 | 43/44.91 |
| 2,842,887 A * | 7/1958 | Matras | A01K 91/04 | 43/44.95 |
| 2,867,936 A * | 1/1959 | Lambach | A01K 93/00 | 43/44.95 |
| 2,876,581 A * | 3/1959 | Schmidt | A01K 93/00 | 43/44.95 |
| 2,895,255 A * | 7/1959 | Irwin | A01K 93/00 | 43/44.95 |
| 2,931,133 A * | 4/1960 | Dodson | A63H 27/10 | 446/222 |
| 2,958,976 A * | 11/1960 | Adams | A01K 91/02 | 43/44.95 |
| 2,965,999 A * | 12/1960 | Marsh | A01K 93/00 | 43/44.87 |
| 3,060,536 A * | 10/1962 | La Vote | D06F 55/02 | 24/346 |
| 3,094,807 A * | 6/1963 | Dorman | A63H 27/10 | 446/222 |
| 3,106,034 A * | 10/1963 | Jonas | A01K 93/00 | 43/44.95 |
| 3,149,435 A * | 9/1964 | Nordeen | A01K 93/00 | 43/43.14 |
| 3,168,790 A * | 2/1965 | Creasey | A01K 93/00 | 43/43.11 |
| 3,246,417 A * | 4/1966 | Esplin | A01K 91/02 | 43/43.14 |
| 3,255,549 A * | 6/1966 | Riley | A01K 91/02 | 43/44.88 |
| 3,280,498 A * | 10/1966 | Decker | A01K 95/00 | 43/43.12 |
| 3,358,399 A * | 12/1967 | Waldmann | A01K 91/02 | 43/4 |
| 3,462,870 A * | 8/1969 | Terilli | A01K 91/02 | 43/4 |
| 3,491,477 A * | 1/1970 | Karras | A01K 91/03 | 43/44.84 |
| 3,589,053 A * | 6/1971 | Fynbo | A01K 93/00 | 43/44.92 |
| 3,597,871 A * | 8/1971 | Hansen | A01K 93/00 | 43/43.14 |
| 3,616,569 A * | 11/1971 | Litt et al. | A63H 27/10 | 446/220 |
| 3,675,276 A * | 7/1972 | Nuse | A01K 91/04 | 24/129 B |
| 3,698,121 A * | 10/1972 | Nordeen | A01K 93/02 | 43/43.14 |
| 3,747,248 A * | 7/1973 | Baer | A01K 91/06 | 43/43.13 |
| 3,757,453 A * | 9/1973 | Therres | A01K 93/00 | 43/43.14 |
| 3,783,551 A * | 1/1974 | Allison | A63H 27/10 | 446/222 |
| 3,925,920 A * | 12/1975 | Walker | A01K 91/08 | 43/44.95 |
| 4,113,261 A * | 9/1978 | Sims | A63F 3/00148 | 446/220 |
| 4,205,478 A * | 6/1980 | Emory | A01K 91/08 | 43/44.95 |
| 4,237,642 A * | 12/1980 | Petorella | A01K 91/18 | 43/27.4 |
| 4,355,444 A * | 10/1982 | Haney | F16G 11/046 | 24/129 B |
| 4,472,902 A * | 9/1984 | Fraser | A01K 91/06 | 24/115 F |
| 4,648,194 A * | 3/1987 | Carroll, Jr. | A01K 91/02 | 43/4.5 |
| 4,784,628 A * | 11/1988 | McArdle | A63H 27/10 | 446/222 |
| 4,858,369 A * | 8/1989 | Collins | A01K 93/00 | 43/44.87 |
| 4,866,874 A * | 9/1989 | Dudley | A01K 85/01 | 43/41.2 |
| 4,936,532 A * | 6/1990 | Williams | A63H 27/10 | 446/222 |
| 5,233,781 A * | 8/1993 | Bigelow | A01K 93/00 | 43/4 |
| 5,241,776 A * | 9/1993 | Adams | A01K 95/02 | 43/44.9 |
| 5,295,891 A * | 3/1994 | Schalk | A63H 27/10 | 362/806 |
| 5,301,392 A * | 4/1994 | Richman | A63H 27/10 | 24/30.5 R |
| 5,356,327 A * | 10/1994 | Gill, III | A63H 27/10 | 446/220 |
| 5,588,897 A * | 12/1996 | Valentino | A63H 27/10 | 446/217 |
| 5,608,985 A * | 3/1997 | Kainec | A01K 91/04 | 43/43.1 |
| 5,651,210 A * | 7/1997 | Moore | A01K 93/00 | 43/4.5 |
| 5,732,500 A * | 3/1998 | Fitzpatrick | A01K 87/06 | 43/4 |
| 5,769,683 A * | 6/1998 | Park | A63H 27/10 | 446/220 |
| 5,799,377 A * | 9/1998 | Carroll | A63H 27/10 | 446/222 |
| 6,487,811 B2 * | 12/2002 | Barrett | A01M 31/06 | 43/43.11 |
| 6,794,023 B1 * | 9/2004 | Melik | A61L 15/26 | 264/210.1 |
| 7,166,343 B2 * | 1/2007 | Noda | A61K 8/85 | 428/35.2 |
| D536,746 S * | 2/2007 | Murray | D21/453 | |
| D542,360 S * | 5/2007 | Murray | D21/453 | |
| 7,249,991 B1 * | 7/2007 | Watson | A63H 27/10 | 446/222 |
| 7,752,719 B2 * | 7/2010 | Howard | B60P 7/0823 | 24/132 AA |
| 7,797,877 B1 * | 9/2010 | Bennis | A01K 91/03 | 43/44.95 |
| 7,854,642 B2 * | 12/2010 | Nelson | A63H 27/10 | 446/222 |
| 8,444,098 B2 * | 5/2013 | Parello | A63H 27/10 | 446/222 |
| 8,568,190 B2 * | 10/2013 | Nelson | A63H 27/10 | 446/220 |
| 2002/0095850 A1 * | 7/2002 | Jones | A01K 91/02 | 43/4 |
| 2003/0148701 A1 * | 8/2003 | Turjanmaa | A63H 27/10 | 446/220 |
| 2004/0198146 A1 * | 10/2004 | Murray | A63H 27/10 | 446/220 |

(56) References Cited

U.S. PATENT DOCUMENTS

| | | | | |
|---|---|---|---|---|
| 2008/0202014 A1* | 8/2008 | Palermo | ............... | A01K 85/01 |
| | | | | 43/42.09 |
| 2011/0076911 A1* | 3/2011 | Bona | ................ | A63H 27/10 |
| | | | | 446/220 |
| 2013/0008077 A1* | 1/2013 | Koch-Schmidt | ....... | A01K 95/02 |
| | | | | 43/44.87 |
| 2014/0084112 A1* | 3/2014 | Stubbe | ............... | A01K 91/06 |
| | | | | 244/155 R |
| 2014/0202060 A1* | 7/2014 | Ohashi | ............... | A01K 91/03 |
| | | | | 43/43.1 |
| 2014/0250764 A1* | 9/2014 | Scopelitis | ............. | A01K 93/00 |
| | | | | 43/44.9 |
| 2016/0029607 A1* | 2/2016 | Mixon, III | ........... | A01K 97/02 |
| | | | | 43/27.2 |

FOREIGN PATENT DOCUMENTS

| | | | | | |
|---|---|---|---|---|---|
| GB | 2379371 A | * | 3/2003 | ............ | A01K 91/06 |
| JP | 10165046 A | * | 6/1998 | | |
| JP | 10304802 A | * | 11/1998 | | |
| JP | 2006006308 A | * | 1/2006 | | |
| JP | 2008017824 A | * | 1/2008 | | |
| KR | 20070050161 A | * | 5/2007 | | |

OTHER PUBLICATIONS

"Balloons and floats, Fit for a King", New Zealand Fishing News, May 6, 2008 (May 6, 2008). [Retrieved from the Internet on Jun. 11, 2016]: URL: http://www.stuff.co.nz/sport/fishing/articles-reviews/bait-tackle/356794/Balloons-and-floats>.*

* cited by examiner

BALLOON FISHING SYSTEM AND METHOD

I. CLAIM OF PRIORITY

This application is a continuation patent application of, and claims priority from, U.S. Provisional Patent Application Ser. No. 61/498,581, filed on Jun. 19, 2011 and entitled "Balloon Fishing System and Method," which is incorporated by reference herein in its entirety for all purposes.

II. FIELD OF THE DISCLOSURE

The present disclosure relates generally to fishing equipment, and more specifically, to balloon fishing rigs.

III. BACKGROUND

Balloon fishing is a technique used by saltwater and freshwater fisherman. A fisherman typically ties a balloon to a fishing line to hold large live or cut bait close to the water's surface where predatory fish feed. The balloon may move more freely than bobbers and floats to give bait a more realistic presentation.

The balloon is conventionally secured to the fishing line in an improvised manner using rubber bands, swivels, or string. Such conventional jerry rigging techniques are relatively haphazard and difficult to manage. Moreover, debris from popped balloons and lost rigging can be harmful to the environment.

IV. SUMMARY OF THE DISCLOSURE

In a particular embodiment, an apparatus includes a first fastener mechanism configured to attach to a fishing line. A second fastener mechanism may be configured to attach to at least one of a balloon and a bobber attachment. At least a portion of the first fastener mechanism may be molded integrally with the second fastener mechanism. The balloon may be inflated and attached to the second fastener mechanism without being tied. The balloon may be constructed from a biodegradable material. The balloon may be configured to pop when exposed to a pressure corresponding to a first depth of water. Balloons may be selected based on desired strengths, colors, and other characteristics.

The second fastener mechanism may include a first notch. The first fastener mechanism may include a second notch. A button may be configured to facilitate the attachment of the fishing line. Depression of the button may allow the first fastener mechanism to slide to a different length of the fishing line. In another embodiment, the button may be configured to facilitate the attachment of the balloon.

A cavity may be formed between the first fastener mechanism and the second fastener mechanism. A biasing mechanism, such as a spring, may be positioned in the cavity. The biasing mechanism may be configured to apply indirect or direct pressure to at least one of the balloon and the fishing line. A tension of the biasing mechanism may be predetermined to enable the first fastener mechanism to remain attached to the fishing line and to allow the first fastener mechanism to slide along a length of the fishing line when a button is depressed.

According to another particular embodiment, a method of manufacturing a fishing rig includes forming a first fastener mechanism configured to attach to a fishing line. A second fastener mechanism configured to attach to at least one of a balloon and a bobber may be formed, and a cavity located between the first fastener mechanism and the second fastener mechanism may be formed. At least a portion of the first fastener mechanism may be molded integrally with the second fastener mechanism. The first fastener mechanism may include a button, and a biasing mechanism may be positioned within the cavity.

Features that characterize embodiments are set forth in the claims annexed hereto and forming a further part hereof. However, for a better understanding of embodiments, and of the advantages and objectives attained through their use, reference should be made to the drawings and to the accompanying descriptive matter.

VI. DETAILED DESCRIPTION

An embodiment of a balloon fishing rig may be relatively easy to use and environmentally friendly. The balloon fishing rig may allow for attachment in seconds and may prevent line slipping. Large live or cut bait may be held near the surface at an adjustable depth where predatory fish school and feed. The balloon fishing rig may retain a substantial portion of a popped balloon to minimize environmental impact. An embodiment of the balloon fishing rig may include a raised or otherwise textured surface to facilitate user handling. The balloon may include a sticky sealed surface to enhance weather resistance.

The balloon fishing rig may be manufactured using plastic injection molding, however, other materials and techniques may be used. For instance, the balloon fishing rig of another embodiment may include ceramics, metals, and rubber, among other materials. An embodiment of the balloon fishing rig may provide line slippage and an adjustable depth setting for live or cut bait.

An embodiment of the balloon fishing rig may be manufactured from a custom, plastic stopper. By depressing a button on a bottom side of the balloon fishing rig, an inner cube structure may be compressed. The compression of the inner cube structure may align a seam on the inner cube with an adjacent seam. Space may be created for the fishing line to be inserted and locked into the bottom of the balloon fishing rig. A balloon may be inflated and inserted into a notch on the side of the balloon fishing rig. The balloon may or may not have a knot. The balloon may be pulled and stretched between the opening in the balloon (or knot) and the inflated portion. The balloon may be inserted into a vertical seam on a top portion of the balloon fishing rig. Releasing the tension on the balloon may lock the balloon into place within the balloon fishing rig. Depressing the button, again, may align the inner and outer seams. The alignment may release the fishing line from the balloon fishing rig. A bottom portion of the latex balloon may be stretched from the side notch. The balloon may be removed from within the seam. The design of the fastener mechanism of the balloon fishing rig may reduce balloon bulging and securely attach the balloon.

An embodiment of the balloon fishing rig may have a rectangular, cylindrical, pyramidal, and/or other geometric shape to facilitate handling under slippery fishing conditions. The selected shape may additionally discourage rolling if dropped onto a boat deck or the ground.

In operation, an inflated latex balloon may be inserted into a vertical seam proximate a top surface of the balloon fishing rig. A button positioned near a side surface of the balloon fishing rig may be used to secure the fishing line. For example, the fishing line may be inserted into a seam when push the button depressed. The seam may include a tapered surface to guide insertion of the fishing line. Releasing or re-depressing the button may lock the fishing line into place. The position of the button on the balloon fishing rig may be located to facilitate handling under slippery fishing conditions.

According to a particular embodiment, an inflated latex balloon is inserted into a relatively deep, wrap-around seam located near a top portion of the balloon fishing rig. The inflated balloon may be thus attached to the balloon fishing rig even with vigorous wind or wave turbulence. The twisting forces applied to the balloon by the design of the wrap-around seam may pinch off the balloon and obviate a need for the balloon to be knotted. The embodiment may be constructed primarily from two molded parts and a single spring, although other embodiments may include more or fewer parts and springs.

The tension of a spring, or biasing mechanism, may be configured to prevent slippage on the fishing line, while not snapping off the fishing line. A single knob may be included in the button to serve as an additional pressure point within a line lock cavity to further restrict line slippage. An exterior surface of the button may include raised surfaces for an improved grip when pressure is applied to the button. For example, the exterior surface may include three, lifted descending size oval shapes.

In another particular embodiment, an inflated latex balloon is inserted into an inverted clip structure located near a top surface of the balloon fishing rig. A fastener mechanism may include clip arms that are pressed to open a clip. The inflated balloon may be inserted above a knot. The clip arms may be released to close clip and to lock the balloon in place.

As with the embodiment described above, the button used to attach the fishing line may be substantially square shaped and may be located to a side of the balloon fishing rig. The positioning of the button may facilitate handling of the balloon fishing rig when pressure is applied to the button to insert the fishing line. The seam for the fishing line may be located at a bottom surface of the balloon fishing rig. The seam may include a notch or other surface to visually enable the user in guiding the fishing line into the seam. The fishing line may be inserted into the seam when the button is depressed. Releasing the button may lock the fishing line into place.

Packaging including balloon fishing rig may include balloons, and replacement refill kits may be sold separately. Packaging may be clipped to a monofilament line and/or a cardboard cutout.

Figure 1:
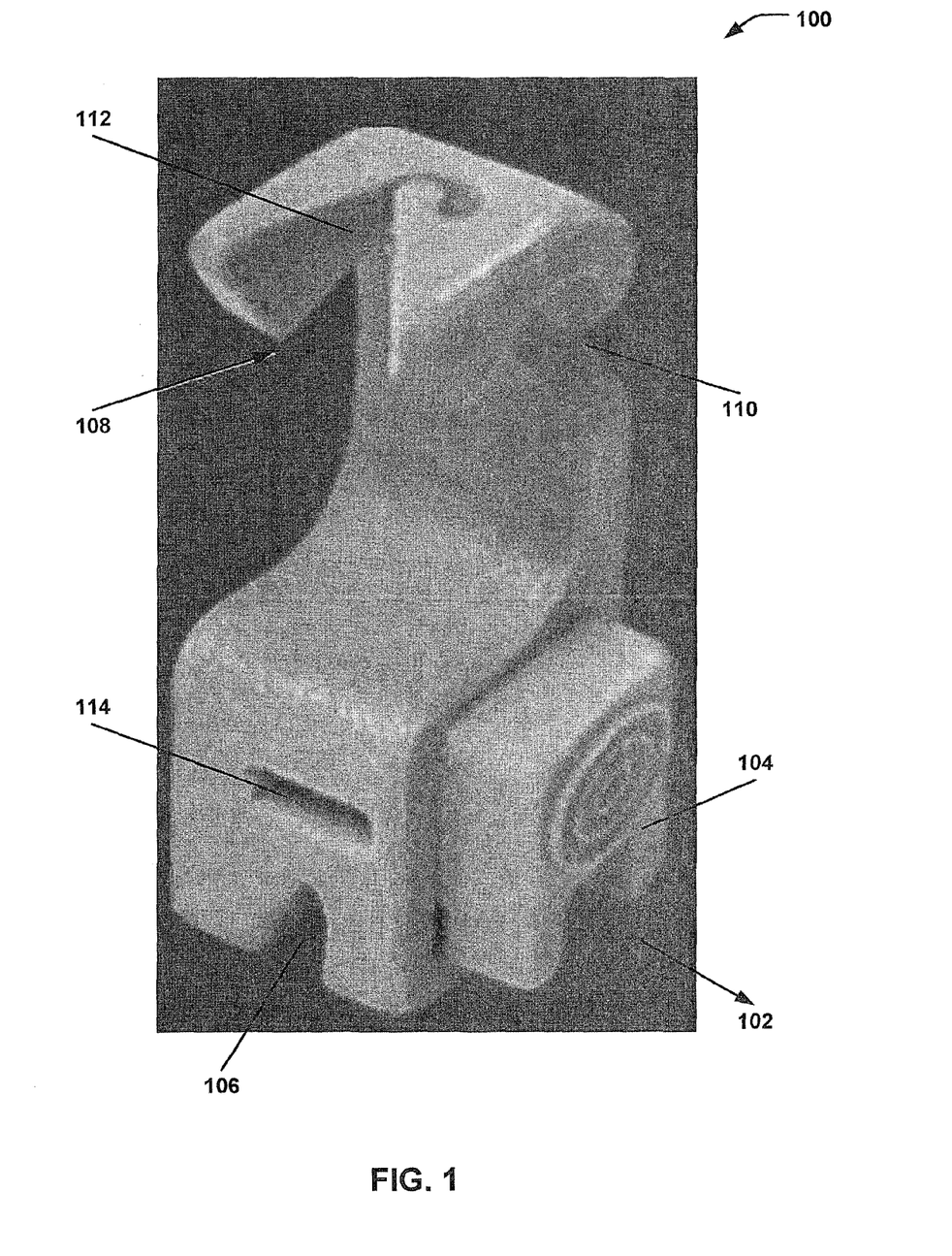
FIG. 1 shows a perspective view of an embodiment of a balloon fishing rig.

Turning more particularly to the drawings, FIG. 1 shows a perspective view of an embodiment of an apparatus, or balloon fishing rig 100. The balloon fishing rig 100 may include a first fastener mechanism 102 configured to attach to a fishing line (not shown). The first fastener mechanism 102 may include a button 104 configured to facilitate the attachment of the fishing line. For instance, the button 104 may be depressed to allow the fishing line to be inserted into a fishing line cavity, or groove 106. The fishing line may become locked in the groove 106 when the button 104 is released. Depression of the button 104 may allow the first fastener mechanism 102 to slide to a different length of the fishing line.

The balloon fishing rig 100 may include a second fastener mechanism 108 configured to attach to a balloon or a bobber (not shown). An end of an inflated balloon (which may or may not include a knot) may be inserted into a first notch 110, or balloon cavity. The balloon may be pulled into a second notch, or contoured groove 112. The contoured groove 112 may cooperate with the notch 110 to secure the balloon to the balloon fishing rig 100.

As shown in FIG. 1, at least a portion of the first fastener mechanism 102 is molded integrally with the second fastener mechanism 108. A cavity 114 may be formed in a section between the first fastener mechanism 102 and the second fastener mechanism 108. A biasing mechanism (not shown) may be positioned in the cavity 114. The biasing mechanism may be affected by the button 104 to apply pressure to the fishing line. Tension of the biasing mechanism may be predetermined to enable the first fastener mechanism 104 to remain attached to the fishing line, while allowing the first fastener mechanism 104 to slide along a length of the fishing line when a button is depressed.

Figure 2:
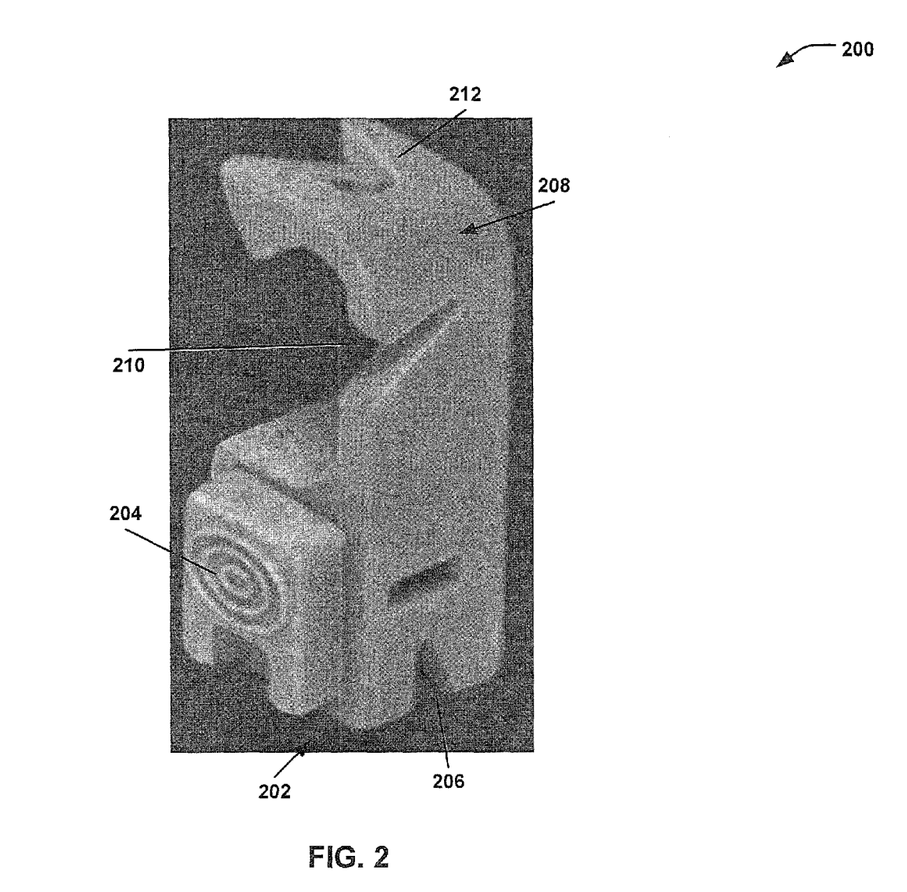
FIG. 2 shows another perspective view of the embodiment of the fishing rig of FIG. 1.

FIG. 2 shows another perspective view of the embodiment of the fishing rig 100 of FIG. 1. The balloon fishing rig 200 may include a first fastener mechanism 202 configured to attach to a fishing line. The first fastener mechanism 202 may include a button 204 and a groove 206. The fishing line may become locked in the groove 206 when the button 204 is released. The balloon fishing rig 200 may additionally include a second fastener mechanism 208 configured to attach to a balloon or a bobber. The second fastener mechanism 208 may include a first notch 210 and a second notch, or contoured groove 212. The contoured groove 212 may cooperate with the notch 210 to secure the balloon to the balloon fishing rig 200.

Figure 3:
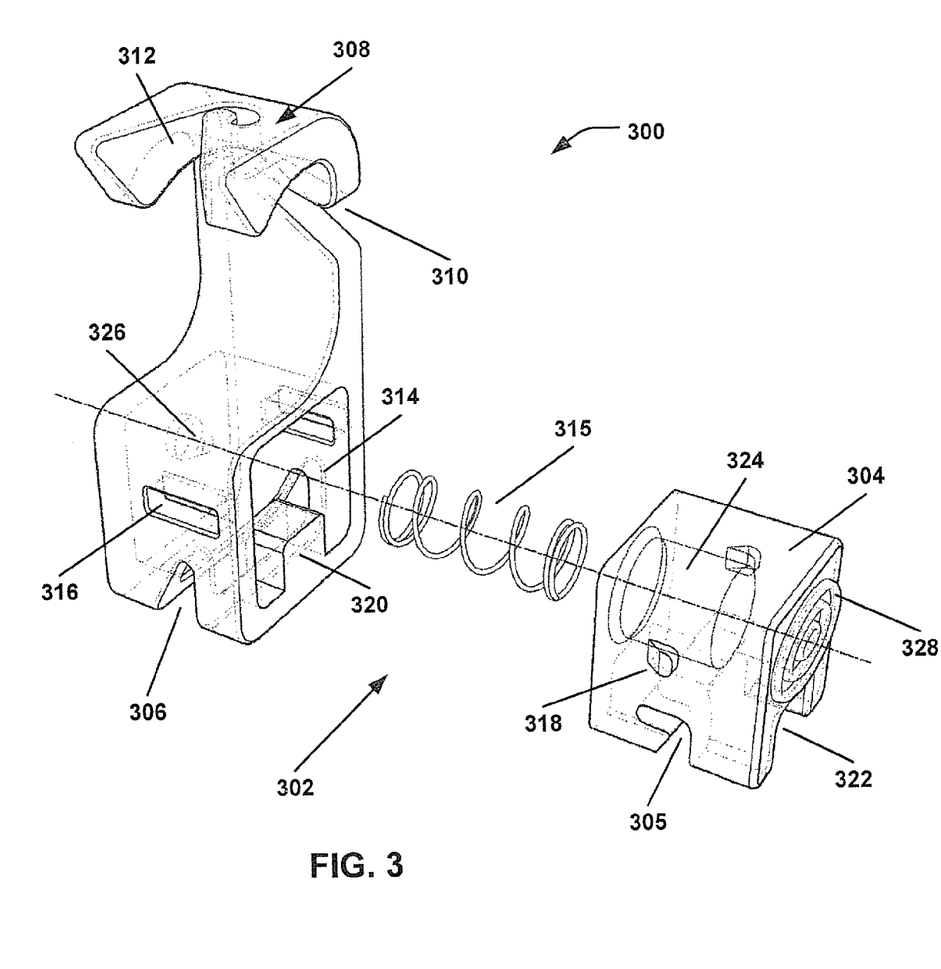
FIG. 3 is an exploded view of an embodiment of a balloon fishing rig similar to the balloon fishing rig of FIG. 1.

FIG. 3 is an exploded view of an embodiment of a balloon fishing rig 300 similar or identical to the balloon fishing rig 100 of FIG. 1. The balloon fishing rig 300 may include a first fastener mechanism 302 configured to attach to a fishing line. The first fastener mechanism 302 may include a button 304 configured to facilitate the attachment of the fishing line. The button 304 may include an angled slot 305. The button 304 may be depressed to allow the angled slot 305 to align with a groove 306. The fishing line may then be inserted into the groove 306 and the slot 305. The fishing line may become locked in the groove 306 and the slot 305 when the button 304 is released. Depression of the button 104 may allow the first fastener mechanism 302 to slide to a different length of the fishing line.

The balloon fishing rig 300 may include a second fastener mechanism 308 configured to attach to a balloon or a bobber (not shown). An end of an inflated balloon may be inserted into a first notch 310. The balloon may be pulled into a second notch, or contoured groove 312. The contoured groove 312 may cooperate with the notch 310 to secure the balloon to the balloon fishing rig 300.

The first fastener mechanism 302 is molded integrally with a portion of the second fastener mechanism 308. A cavity 314 may be formed in a section between the first fastener mechanism 302 and the second fastener mechanism 308. A biasing mechanism 315 may be positioned in the cavity 314. The biasing mechanism 315 may be manipulated by the button 304 to apply pressure to the fishing line. Tension of the biasing mechanism 315 may be predetermined to enable the first fastener mechanism 304 to remain attached to the fishing line, while allowing the first fastener mechanism 304 to slide along a length of the fishing line when a button is depressed.

One or more guide slots 316 may guide protrusions 318 extending from side surfaces of the button 314. A cavity protrusion 320, or knob, may further guide the button 304 and may slide within a track cavity 322 of the button 304. The cavity protrusion 320 may further function to lock the fishing line into the slot 305 when the button 304 is not depressed. A coil cavity 324 in the button 304 and a coil protrusion 326 in the cavity 314 may guide the biasing mechanism 315. The button 304 of FIG. 3 includes raised surface ridges 328 to assist in handling.

Figure 4:
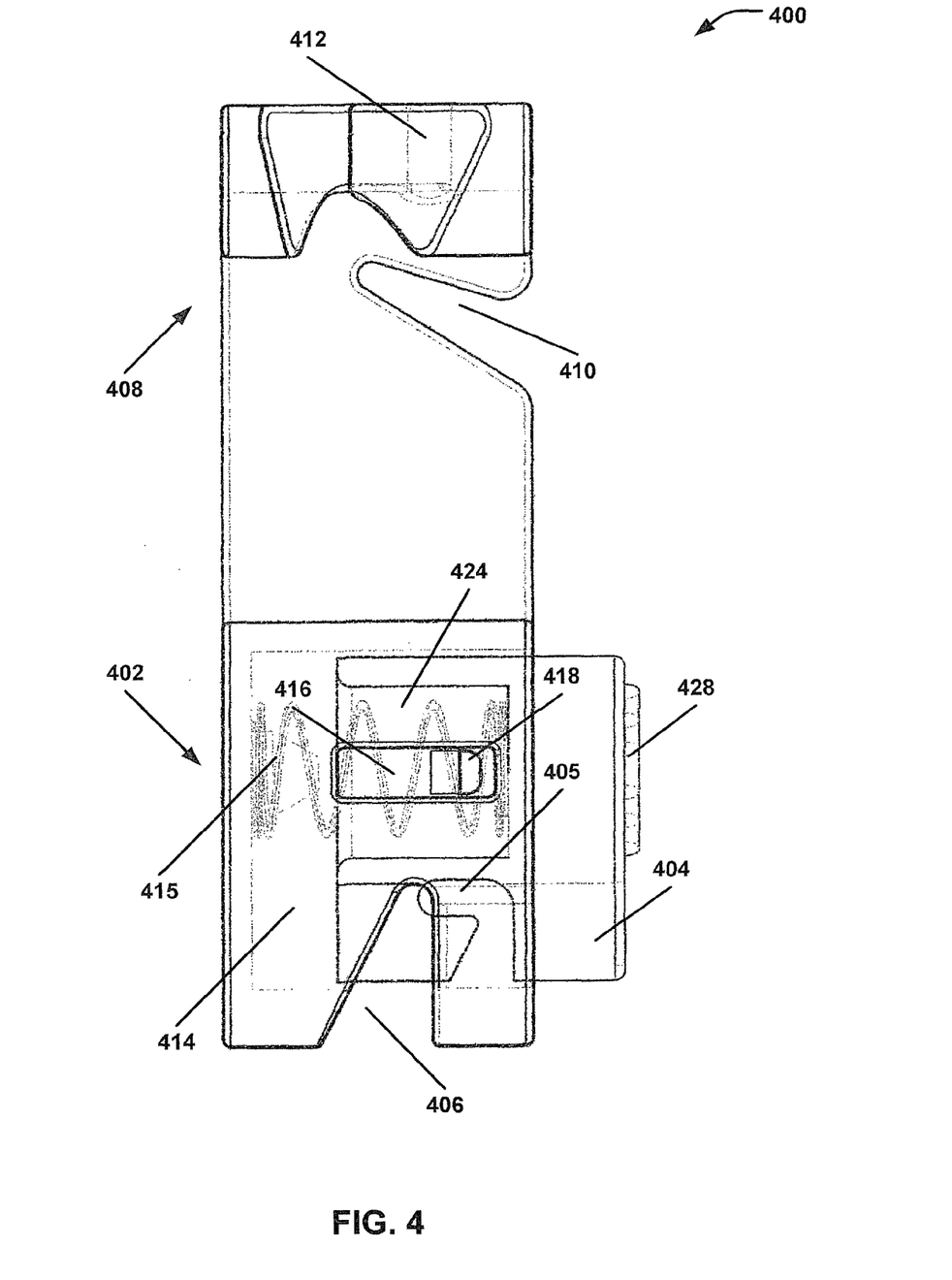
FIG. 4 is a side-view of the balloon fishing rig of FIG. 3.

FIG. 4 is a side-view of the balloon fishing rig 300 of FIG. 3. The balloon fishing rig 400 may include a first fastener mechanism 402 configured to attach to a fishing line. The first fastener mechanism 402 may include a button 404 and an angled slot 405. The button 404 may be depressed to allow the angled slot 405 to align with a tapered groove 406. The fishing line may then be inserted into the groove 406 and the slot 405. The fishing line may become locked in the groove 406 and the slot 405 when the button 404 is released.

The balloon fishing rig 400 may include a second fastener mechanism 408 having a first notch 410 and a contoured groove 412 configured to secure a balloon. A cavity 414 may be formed in a section between the first fastener mechanism 402 and the second fastener mechanism 408. A biasing mechanism 415 may be positioned in the cavity 414. The biasing mechanism 415 may be manipulated by the button 404 to apply pressure to the fishing line.

A guide slot 416 may guide a protrusions 418 extending from side surfaces of the button 414. A coil cavity 424 in the button 404 may accommodate the biasing mechanism 415. The button 404 of FIG. 4 includes raised surface ridges 428.

Figure 5:
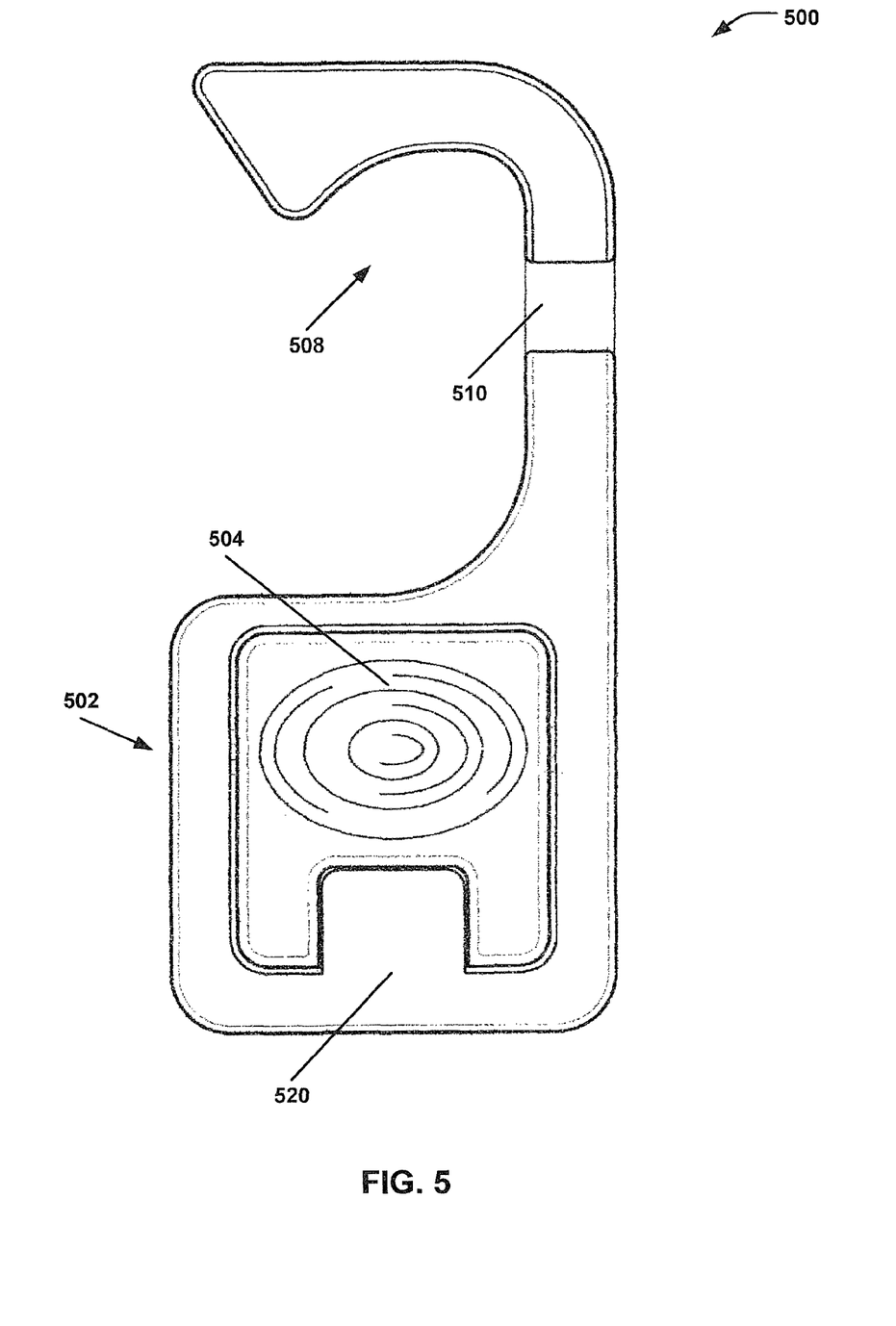
FIG. 5 is a front-view of the balloon fishing rig of FIG. 3.

FIG. 5 is a front-view of the balloon fishing rig 300 of FIG. 3. The balloon fishing rig 500 may include a first fastener mechanism 502 configured to attach to a fishing line. The first fastener mechanism 502 may include a button 504 with a raised, textured surface. The balloon fishing rig 500 may include a second fastener mechanism 508 having a first notch 510 configured to secure a balloon. A cavity protrusion 520, or knob, may guide the button 504 and function to secure the fishing line when the button 504 is not depressed.

Figure 6:
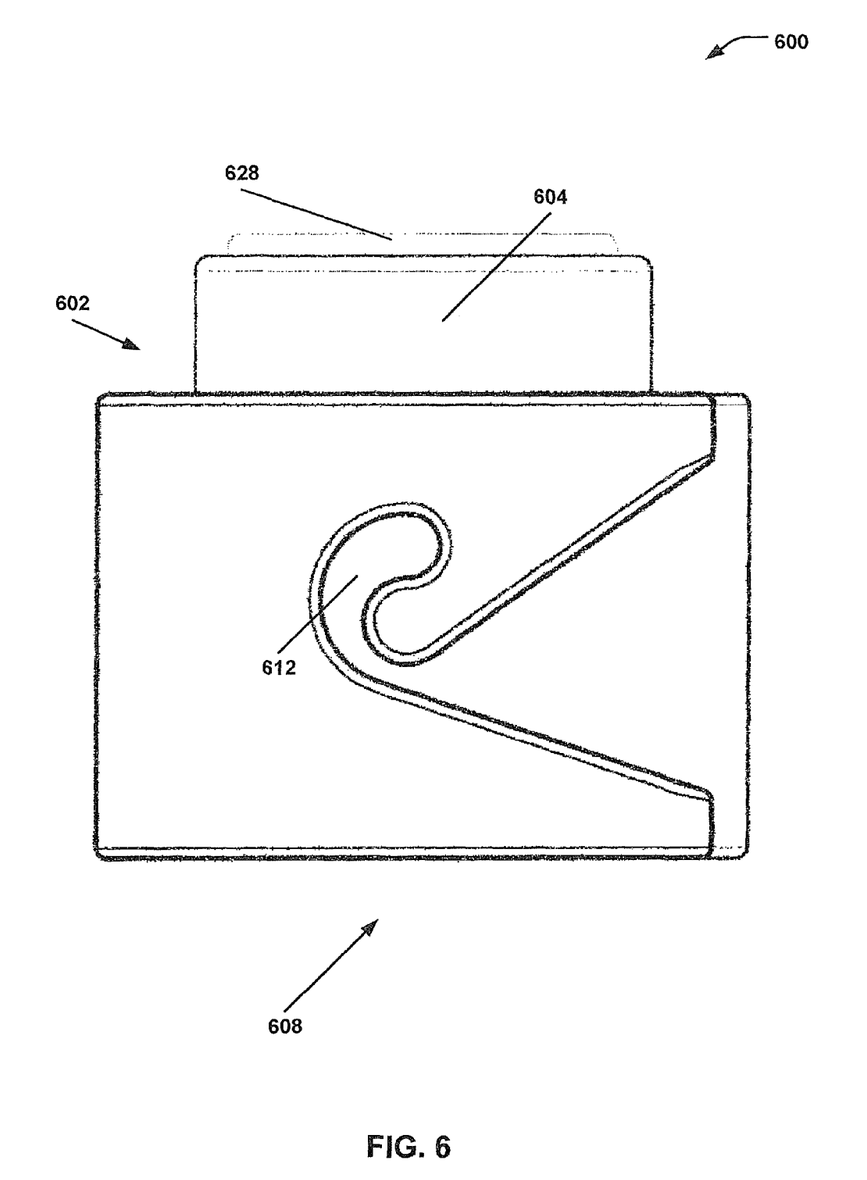
FIG. 6 is a top-view of the balloon fishing rig of FIG. 3.

FIG. 6 is a top-view of the balloon fishing rig 300 of FIG. 3. The balloon fishing rig 600 may include a first fastener mechanism 602 configured to attach to a fishing line. The first fastener mechanism 602 may include a button 604. The button 604 includes raised surface ridges 628. A second fastener mechanism 608 may have a contoured groove 612 configured to secure a balloon.

Figure 7:
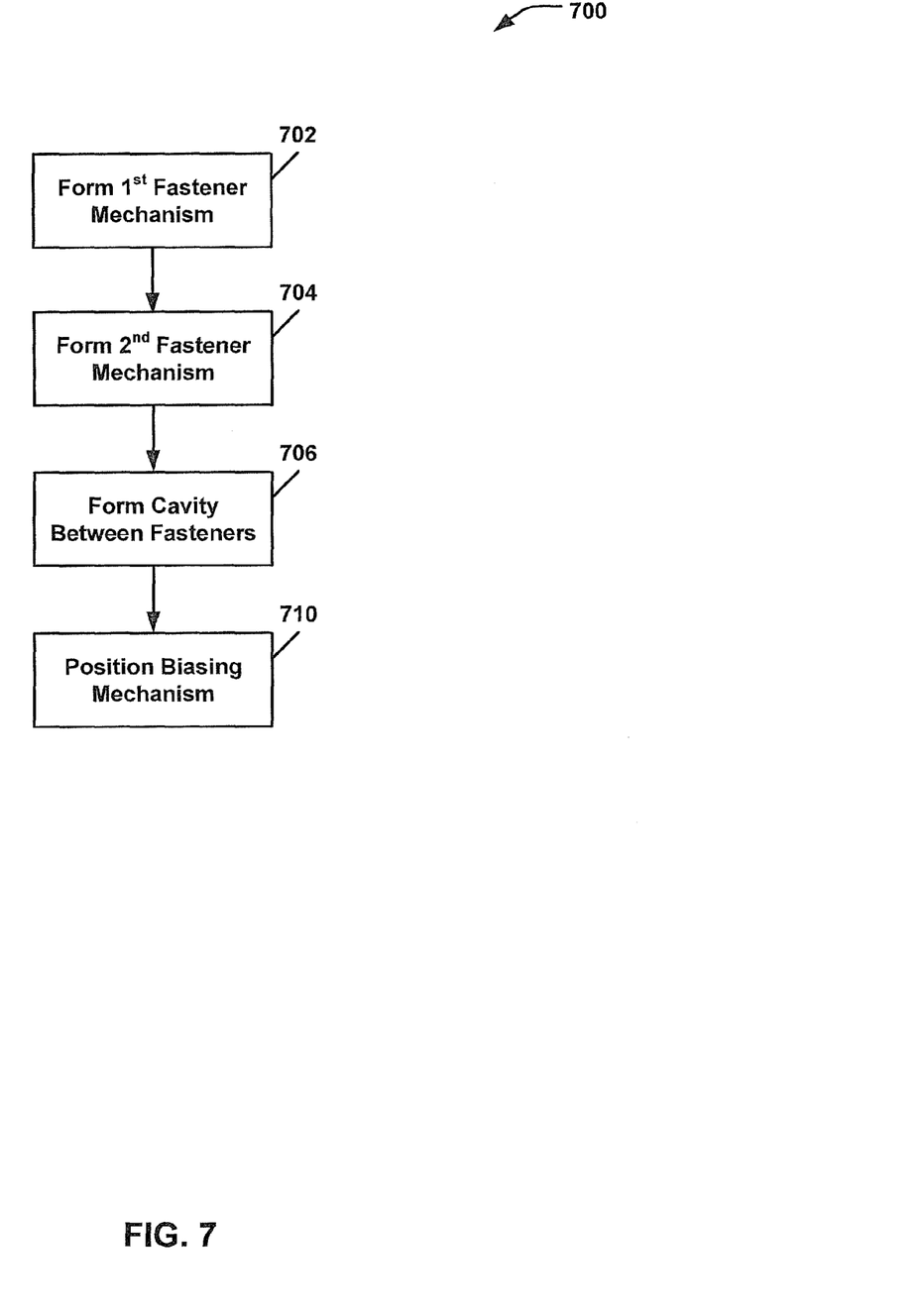
FIG. 7 is a flowchart of an embodiment of a method of manufacturing a fishing rig, such as the fishing rigs shown in FIGS. 1-6.

FIG. 7 is a flowchart of a method consistent with an embodiment of the present invention. For example, the flowchart describes an embodiment of manufacturing a fishing rig, such as the fishing rigs shown in FIGS. 1-6. At 702, a first fastener mechanism configured to attach to a fishing line may be formed. The first fastener mechanism may include a fishing line cavity and may cooperate with a release/lock button to secure the fishing line. The fishing line may be secured in a manner that enables bait depth setting.

A second fastener mechanism at 704 may be configured to attach to at least one of a balloon and a bobber. The second fastener may include a balloon notch and contoured groove configured secure the balloon or bobber. The first and second fastener mechanisms may be mechanically attached to one another or molded integrally.

At 706, a cavity may be formed. In an embodiment, the cavity may be located between the first fastener mechanism and the second fastener mechanism. A biasing mechanism may be positioned at 708 inside the cavity to facilitate fishing line locking and release.

While the present embodiments have been described in detail, it is not the intention of the Applicant to restrict, or any way limit the scope of the appended claims to such detail. The embodiments in their broader aspects are therefore not limited to the specific details, representative apparatus, methods, and illustrative examples shown and described. Accordingly, departures may be made from such details without departing from the scope of Applicant's general inventive concept.

The invention claimed is:

1. An apparatus, comprising:
a body extending along a longitudinal axis thereof and having a first lower portion and a second upper portion:
the first lower portion comprising:
a first fastener mechanism configured to attach to a fishing line, wherein the first, fastener mechanism includes:
a biasing mechanism configured to apply pressure to the fishing line; and
a button configured to allow the first fastener mechanism to selectively slide along a length of the fishing line, wherein depression of the button causes force to be incident upon the biasing mechanism in such a manner as to affect the pressure; and
the second upper portion comprising:
a second fastener mechanism configured to attach to a balloon, wherein the second fastener includes:
a first notch to receive and secure the balloon, the first notch extending within a first plane and having first and second ends, the first end of the first notch at an edge of the body and the second end of the first notch being within the body, the first notch tapering from the first end toward the second end; and
a second notch to receive and secure the balloon, the second notch extending within a second plane and having first and second ends, the first end of the second notch at another edge of the body and the second end of the second notch being within the body, the second notch tapering from the first end toward the second end; and
wherein the first and second planes are transverse to each other.

2. The apparatus of claim 1, wherein the first fastener mechanism is molded integrally with the second fastener mechanism.

3. The apparatus of claim 1, further comprising the balloon attached to the second fastener mechanism.

4. The apparatus of claim 3, wherein the balloon, is inflated and attaches to the second fastener mechanism without being tied before being attached.

5. The apparatus of claim 3, wherein the balloon is constructed from a biodegradable material.

6. The apparatus of claim 3, wherein the balloon is configured to pop when exposed to a pressure corresponding to a first depth of water.

7. The apparatus of claim 6, further comprising another balloon, wherein the another balloon is packaged with the balloon and is configured to pop when exposed to a pressure corresponding to a second depth of water.

8. The apparatus of claim 1, wherein the first fastener mechanism includes a groove.

9. The apparatus of claim 8, wherein depression of the button causes a slot in the button to become aligned with the groove so as to allow the first fastener mechanism to selectively slide along the length of the fishing line.

10. The apparatus of claim 1, further comprising a cavity formed between the first fastener mechanism and the second fastener mechanism.

11. The apparatus of claim 10, wherein the biasing mechanism is positioned within the cavity.

12. The apparatus of claim 1, wherein a tension of the biasing mechanism is predetermined to enable the first fastener mechanism to remain attached to the fishing line and to allow the first fastener mechanism to slide along the length of the fishing line when the button is depressed.

* * * * *